R. H. HILL.
UNIVERSAL BORING MACHINE.
APPLICATION FILED SEPT. 22, 1917.

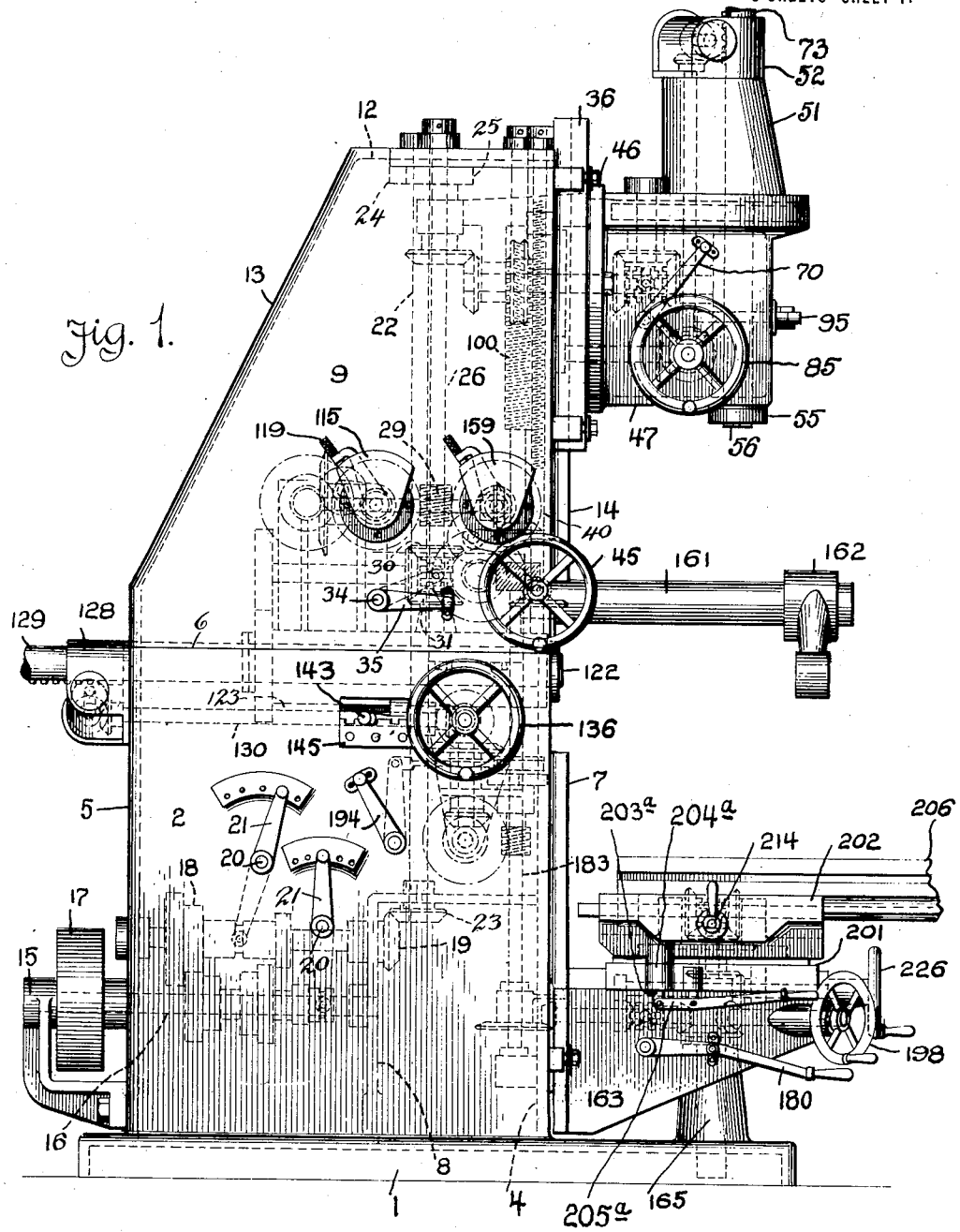

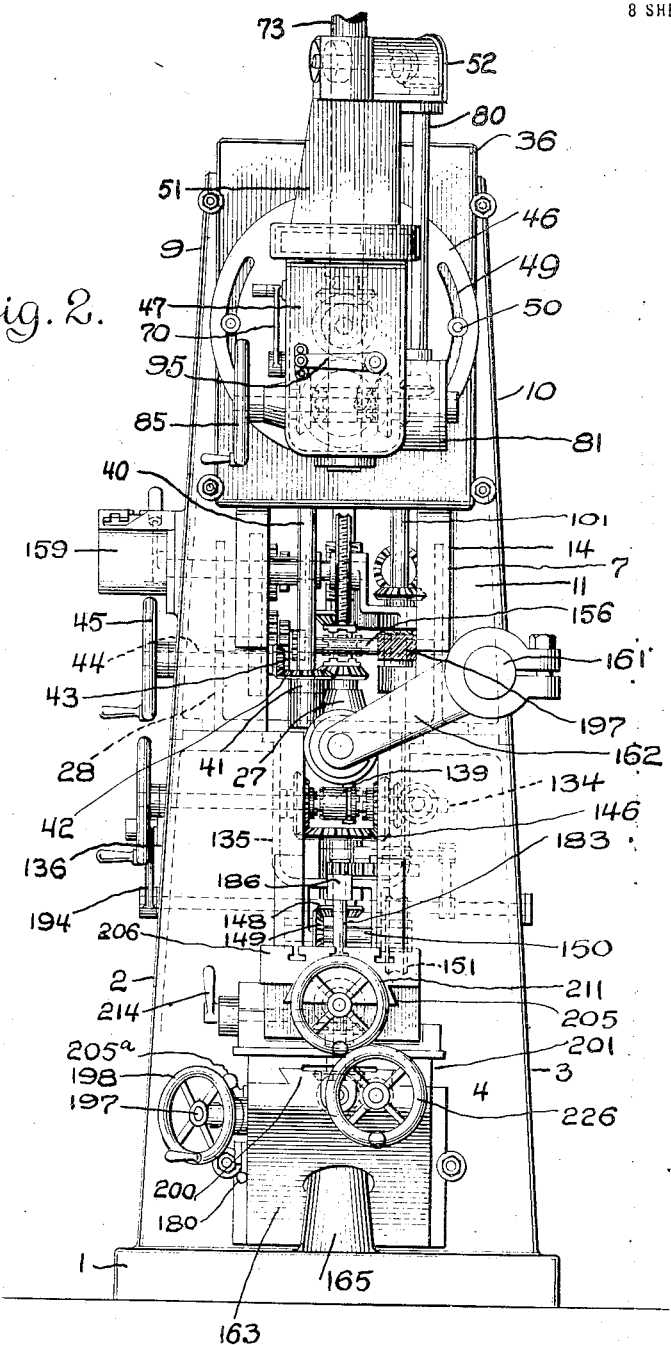

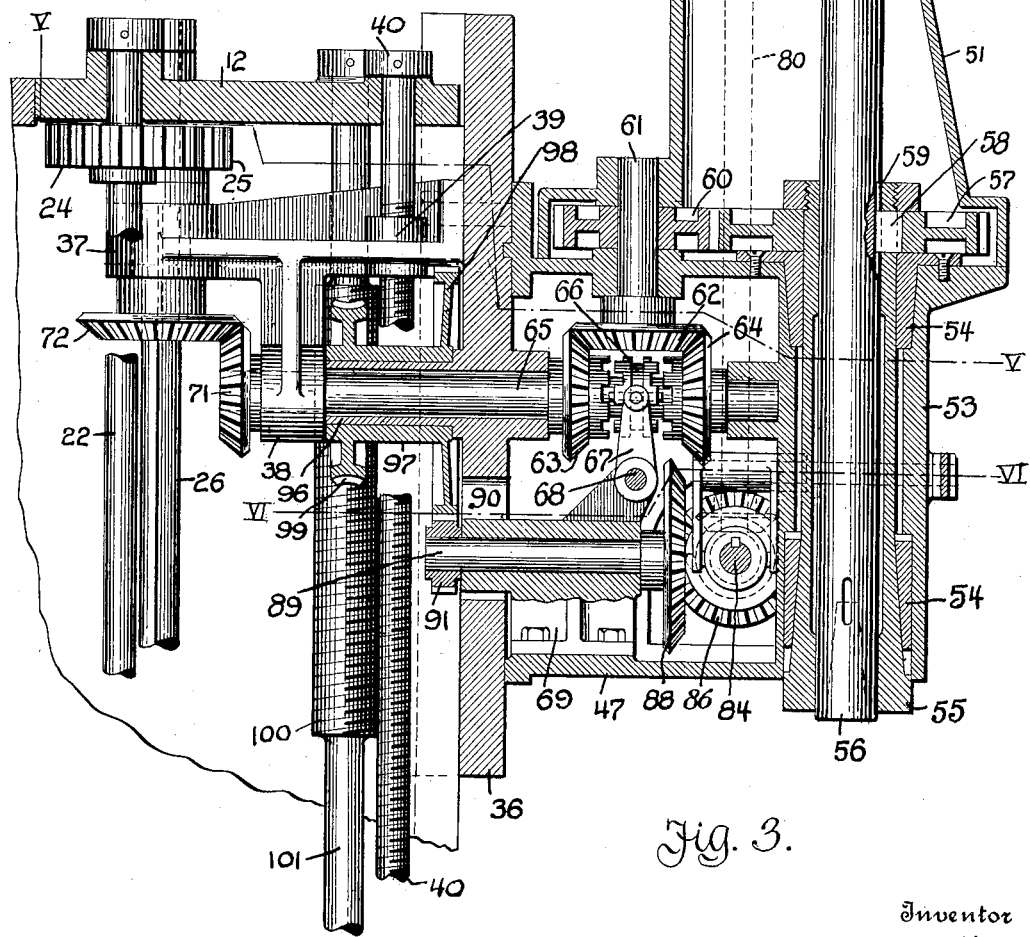

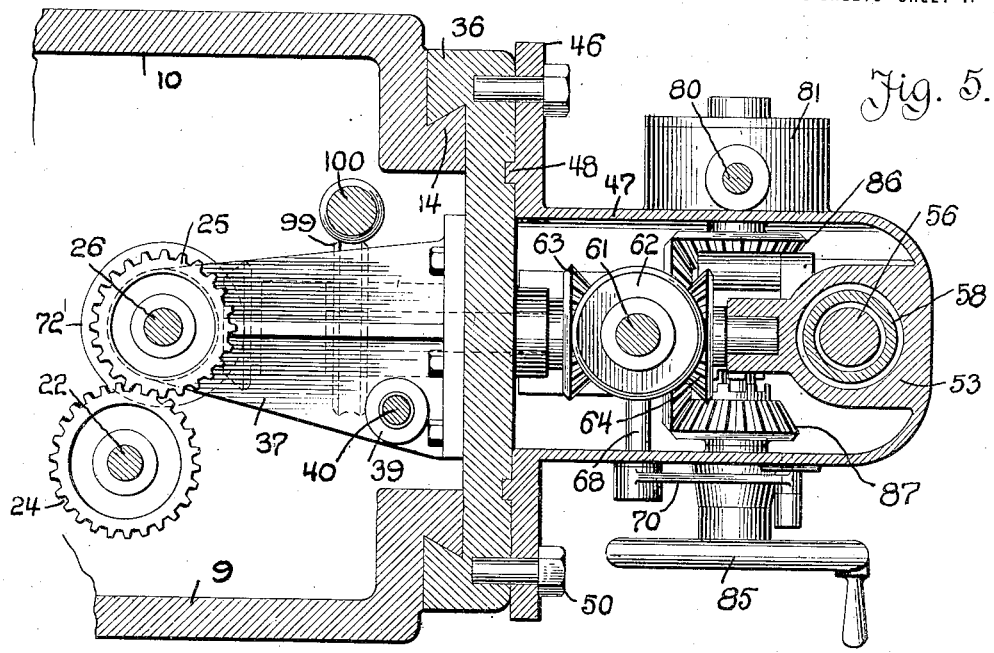
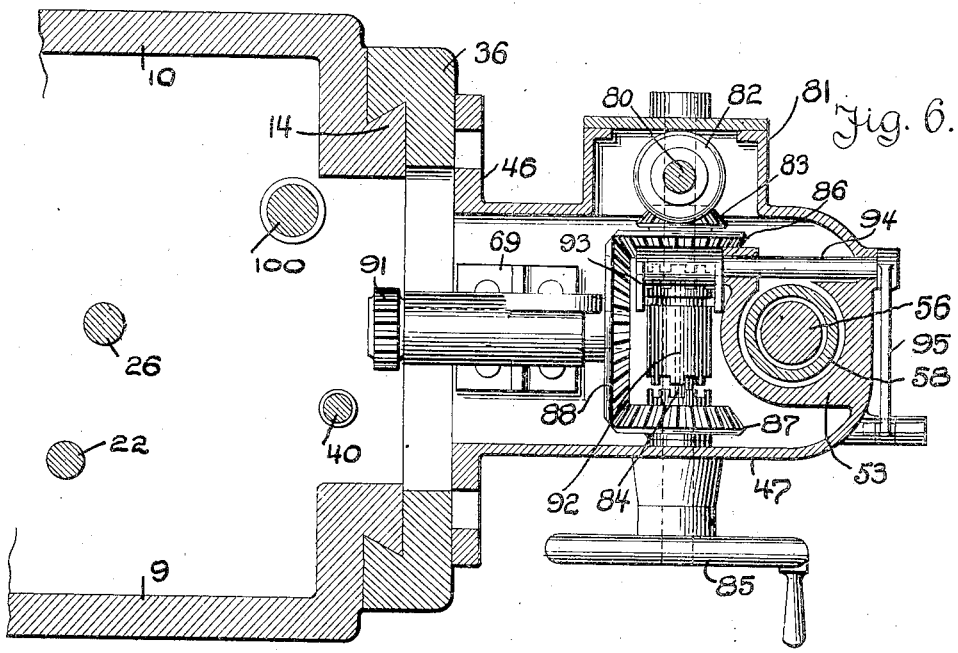

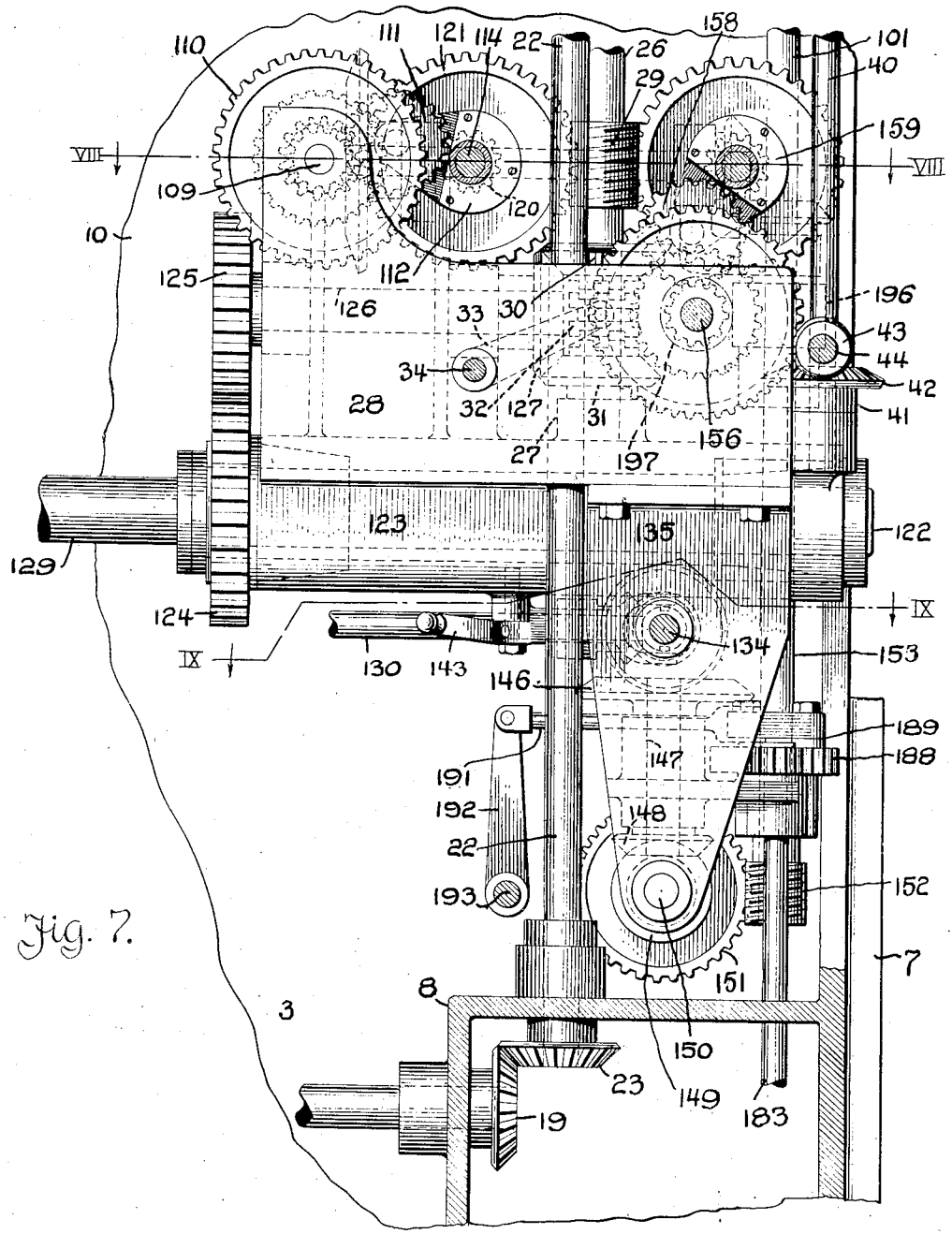

1,284,894.

Patented Nov. 12, 1918.
8 SHEETS—SHEET 7.

Witness
Chas. W. Stauffer
Karl H. Butler

Inventor
Raymond H. Hill,
By
Attorneys

R. H. HILL.
UNIVERSAL BORING MACHINE.
APPLICATION FILED SEPT. 22, 1917.

1,284,894.

Patented Nov. 12, 1918.
8 SHEETS—SHEET 8.

Witness
Char W. Stauffiger
Karl H. Butler

Inventor
Raymond H. Hill,
By
Attorneys

UNITED STATES PATENT OFFICE.

RAYMOND H. HILL, OF DETROIT, MICHIGAN.

UNIVERSAL BORING-MACHINE.

1,284,894.           Specification of Letters Patent.      Patented Nov. 12, 1918.

Application filed September 22, 1917. Serial No. 192,660.

*To all whom it may concern:*

Be it known that I, RAYMOND H. HILL, a citizen of the United States of America, residing at Detroit, in the county of Wayne and State of Michigan, have invented certain new and useful Improvements in Universal Boring-Machines, of which the following is a specification, reference being had therein to the accompanying drawings.

This invention relates to a boring machine, and has special reference to that type of machine which permits of various kinds of drills, bits, cutters and other tools being used for performing various operations upon a piece of work correctly positioned in or on the machine, and such machine possesses the following characteristics:

First, there is a novel main frame consisting of parts that may be easily and quickly assembled and this main frame conceals the greater part of a main operating mechanism including a change speed gear mechanism, which permits of the machine being operated at various speeds, certain speeds being more essential than others for certain operations on a piece of work.

Second, there is a novel horizontal spindle and arbor rest with an operating mechanism for the horizontal spindle by which reciprocable and rotary movements may be imparted to the spindle, with a controlling mechanism for each movement so that said movement may be reversed and in consequence of which the tool may be shifted to and from a piece of work.

Third, the machine includes a universal head having vertical and angular adjustment, the vertical adjustment being by power and the angular adjustment by hand. The universal head supports a spindle and a portion of its operating mechanism, said mechanism including means for imparting a reciprocable and rotary movement to the spindle, also means for reversing either movement of the spindle.

Fourth, there is a novel universal table capable of vertical, rotary and lateral adjustment, the vertical adjustment being by power or hand, the lateral adjustment by power or hand, and the rotary adjustment by hand alone. Such a table permits of a piece of work held thereby being correctly positioned relatively to the horizontal and vertical spindles, both of which may operate in synchronism should it be desired to perform two operations at one time upon a piece of work on the table.

The machine, besides possessing the above characteristics also includes positive and reliable means, accessible to a machinist or other artisan for controlling the various operations of the machine, which as a whole, has sufficient strength and rigidity to withstand the stresses and strains to which it may be subjected when operating upon a piece of work. The machine includes various novel features which will hereinafter appear, and for convenience of describing my invention, the principal elements namely: — main frame; main operating mechanism; universal head; vertical spindle and its operating mechanism; horizontal spindle and its operating mechanism; universal table; will be hereinafter separately and specifically described in detail, together with the novel arrangement and objects accomplished from such a combination of elements.

Reference will now be had to the drawings, wherein—

Figure 1 is a side elevation of a boring machine in accordance with my invention;

Fig. 2 is a front elevation of the same;

Fig. 3 is a vertical sectional view of the universal head, its vertical spindle, and the operating mechanism thereof;

Fig. 4 is a horizontal sectional view taken on the line IV—IV of Fig. 3;

Fig. 5 is a similar view taken on the line V—V of Fig. 3;

Fig. 6 is a similar view taken on the line VI—VI of Fig. 3;

Fig. 7 is an enlarged side elevation of a portion of the operating mechanism of the machine;

Figure 8:
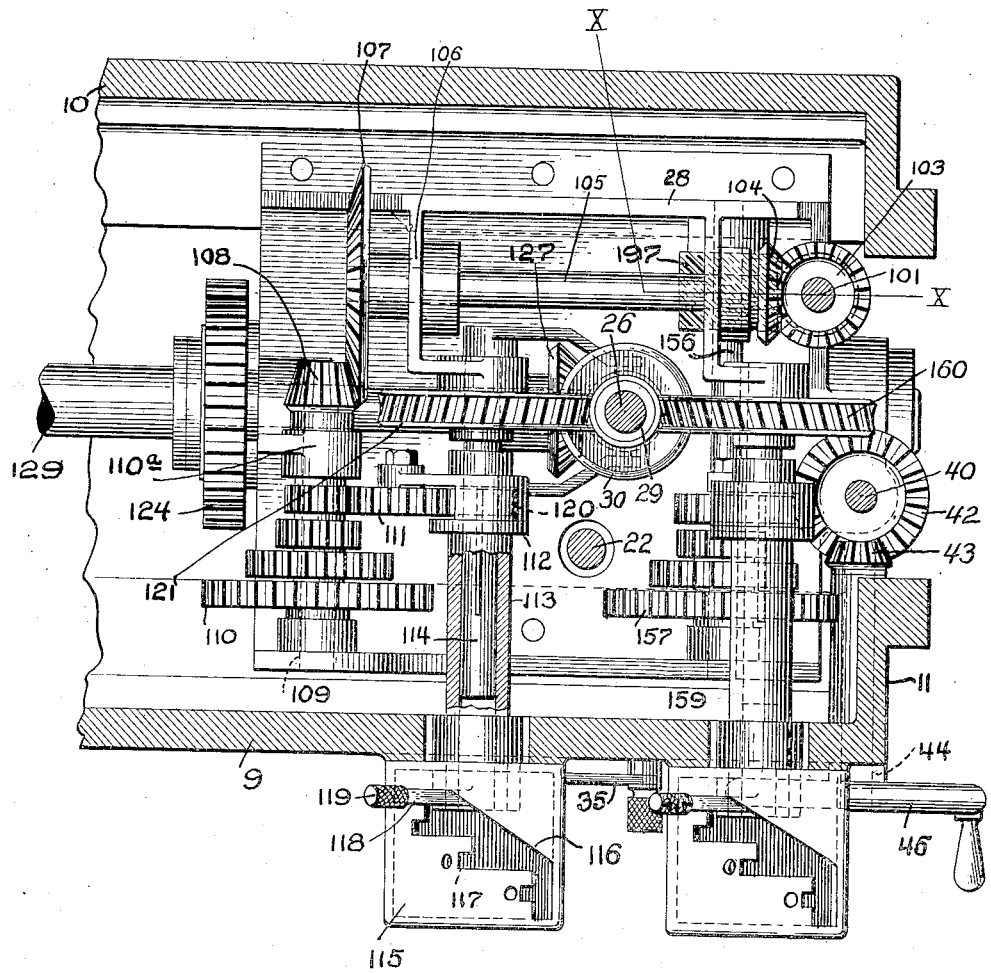
Fig. 8 is a horizontal sectional view taken on the line VIII—VIII of Fig. 7.

In describing my invention by aid of the views above referred to, I desire to point out that the same are intended as merely illustrative of an example by which my invention may be put in practice, and I do not care to limit myself to the precise construction and arrangement of parts shown. The following description is therefore to be broadly construed as including such substitute constructions and arrangement of parts which are the obvious equivalent of those to be hereinafter referred to.

By referring to a "vertical" spindle, defining other elements as to their normal positions, and using terms as "horizontal," "front" and "rear," etc., such are employed for the convenience of describing the invention, as a great many of the machine elements necessarily change their position.

*Main frame*, (Figs. 1 and 2.)

The main frame comprises a base 1 and on the base is a pedestal section comprising side walls 2 and 3, a front wall 4, a rear wall 5, said walls being connected by a top wall 6. The front wall 4 has a vertical opening with shears 7 at the sides thereof and connecting the side walls 2 and 3 is an angular frame 8. The top wall 6 affords a seat for a top section having side walls 9 and 10, a front wall 11, a top wall 12 and an inclined rear wall 13. The walls 9 and 10 are flush with the walls 2 and 3 of the pedestal section, and the front wall 11 is flush with the front wall 4 of the pedestal section. The front wall 11 has a vertical opening with shears 14 at the sides thereof, and the top section may be suitably connected to the pedestal section so as to provide a rigid and durable structure.

Figure 9:
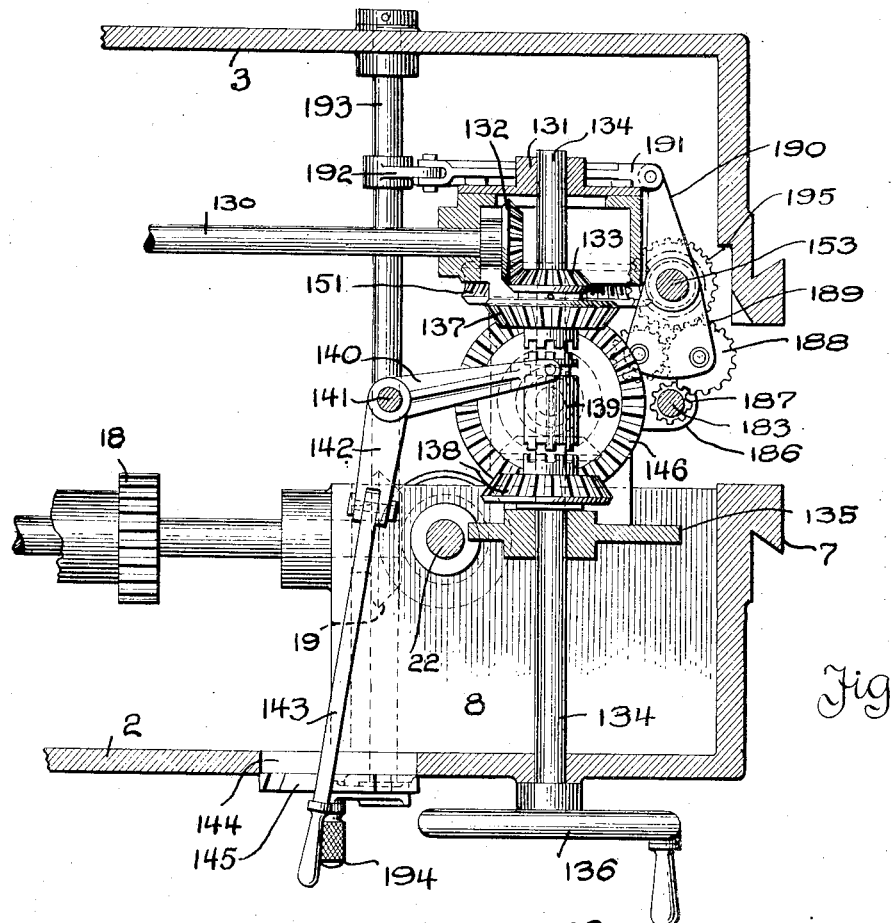
Fig. 9 is a similar view taken on the line IX—IX of Fig. 7.

*Main operating mechanism,* (Figs. 1, 7, and 9.)

The rear wall 5 of the pedestal section of the machine has a bracket 15 and this wall has an opening through which extends a power shaft 16, journaled in the bracket 15 and the vertical portion of the angle frame 8. On the power shaft 16 is a pulley or power transmission means 17 so that power may be transmitted to the machine from a motor or suitable source of power. The power shaft 16 also forms part of a change speed gear mechanism of a conventional form, generally designated 18 and best shown in dotted lines in Fig. 1, as including a counter-shaft and shiftable speed gears by which variable speed may be imparted to a beveled gear wheel 19 from the power shaft 16. The shifting of the speed gears is accomplished through the medium of rock shafts 20 provided with cranks 21 at the outer side of the wall 2, said cranks being set for desired speed.

Journaled in the horizontal portion of the angle frame 8 is the lower end of a vertical shaft 22 extending upwardly in the top section of the machine and having its upper end journaled in the top wall 12 of said section. The lower end of the main vertical shaft 22 has a beveled gear wheel 23 meshing with the beveled gear wheel 19 and at the upper end of the main vertical shaft is a horizontal gear wheel 24 meshing with a similar gear wheel 25 on an auxiliary vertical shaft 26. The auxiliary vertical shaft 26 has the upper end thereof journaled in the top wall 12 of the top section and the lower end thereof journaled in a bearing 27, carried by a U-shaped frame 28 mounted on the top wall 6 of the pedestal section of the machine.

The vertical shafts 22 and 26 constitute the main shafts of the machine and on the auxiliary shaft 26 is a worm 29 and loose horizontal beveled gear wheels 30 and 31. Slidably keyed on the shaft 26, between the beveled gear wheels 30 and 31, and adapted for rotation with said shaft, is a clutch member 32 that may be shifted into interlocked engagement with face of either of the beveled gear wheels 30 or 31 to establish rotative continuity between the auxiliary shaft 26 and either gear wheel. The clutch member 32 is shifted through the medium of a crank or fork 33 on a rock shaft 34 journaled in the frame 28 and side wall 9 of the machine, said rock shaft having the outer end thereof provided with a crank 35 that may be set to hold the clutch member 32 in a shifted position.

The beveled gear wheels 30 and 31 permit of power being obtained from the auxiliary vertical shaft 26 for operating a horizontal spindle, which will be hereinafter referred to, and the clutch member 32 constitutes means for imparting a desired rotatory movement to the horizontal spindle.

*Universal head,* (Figs. 1, to 6 inclusive.)

The shears 14 of the front wall 11 of the top section of the machine form a dovetailed connection with a plate 36 that may be raised and lowered on the shears relatively to the top section of the machine. The plate 36 has a bracket 37 extending into the top section of the machine and loosely surrounding the auxiliary vertical shaft 26. Depending from the bracket 37 is a hanger 38 and said bracket has a nut portion 39 in engagement with a screw shaft 40 said shaft having the upper end thereof journaled in the top plate 12 and the lower end thereof journaled in a bearing 41 carried by the frame 28. On the lower end of the screw shaft 40 is a beveled gear wheel 42 meshing with a similar wheel 43, on a shaft 44 journaled in the frame 28 and the side wall 9, said shaft having the outer end thereof provided with a hand wheel 45 so that a rotary movement may be imparted to the screw shaft 40 to raise and lower the bracket 37 and consequently the plate 36 on the front wall 11 of the machine. The elements 39 to 45 inclusive constitute means for manually raising and lowering the universal head.

Rotatable on the plate 36 is a circular face plate 46 of a housing 47, said face plate having curved tongues 48 extending into grooves provided therefor in the plate 36. The face plate 46 also has segment shaped slots 49 and extending through said slots into the plate 36 are screw bolts 50 or other fastening means adapted for fixing the face plate 46 relative to the plate 36. By releasing the screw bolts 50 and partially rotating the face plate 46, the housing 47 may be set in angular relation to the top section of the machine.

On the housing 47 is a cap 51 and on the cap is a bearing 52 both of which are essential in connection with the vertical spindle and its operating mechanism, which will be considered in the following caption.

*Vertical spindle and its operating mechanism*, (Figs. 1 to 6 inclusive.)

In the outer end of the housing 47 is a sleeve portion 53 for end thrust bearings 54 of the main bearing 55 in which a vertical spindle 56 is journaled, such spindle having the lower end thereof adapted to receive or hold a suitable tool. The main bearing 55 is rotatable with the spindle 56 and rotatable with said spindle and its bearing is a large horizontal gear wheel 57 having a key or spline 58 extending into a longitudinal groove 59 in the spindle 56. It is therefore possible for the spindle 56 to be raised and lowered during a rotative movement thereof.

The horizontal gear wheel 57 is in the lower part of the cap 51 and meshes with a similar wheel 60 mounted on a shaft 61, journaled in the cap 51 and the upper wall of the housing 47. The inner end of the shaft 61 has a beveled gear wheel 62 constantly in mesh with beveled gear wheels 63 and 64 loose on a shaft 65, journaled in the hanger 38 and the sleeve portion 53 of the housing 47. A clutch member 66 is slidably keyed on the shaft 65, between the beveled gear wheels 63 and 64, for interlocking engagement with either, so that either gear wheel may be fixed relative to the shaft 65 to impart movement to the spindle 56 in a desired rotary direction.

To shift the clutch member 66, a fork or crank 67 is employed, said fork or crank being carried by a rock shaft 68, journaled in a bearing 69, mounted within the housing 47. The rock shaft 68 extends out of the housing 47 and is provided with a crank 70 that may be set to hold the clutch member 66 in engagement with a desired beveled gear wheel.

The end of the shaft 65 within the top section of the machine has a beveled gear wheel 71 meshing with a horizontally disposed beveled gear wheel 72 slidably keyed upon the auxiliary vertical shaft 26 and adapted for rotation with said shaft, even while the housing 47 is being raised and lowered.

Considering the mechanism for raising and lowering the vertical spindle 56, said spindle has the upper end thereof reduced and provided with a loose rack sleeve 73, said sleeve extending through the bearing 52 and held against rotation, without interfering with the spindle 56, by having the rack 74 thereof slidable in a vertical slot 75 of the bearing 52. The rack 74 meshes with a pinion 76 mounted upon an angularly disposed shaft 77 journaled in the bearing 52. The bearing 52 overhangs the side of the cap 51 and the end of the shaft 77 has a beveled gear wheel 78 meshing with the beveled gear wheel 79 on the upper end of a shaft 80 that extends downwardly at the outer side of the cap 51 into a side extension 81 of the housing 47. On the lower end of the shaft 80 is a beveled gear wheel 82 meshing with a similar gear wheel 83 on the inner end of a transverse shaft 84 journaled in the lower part of the housing 47. On the outer end of the shaft 84 is a hand wheel 85 which permits of said shaft being manually rotated and consequently the operator of the machine may manually raise and lower the vertical spindle 56.

Power may be employed for raising and lowering the vertical spindle 56, and to this end, the transverse shaft 84 is provided with two loose beveled gear wheels 86 and 87 constantly in mesh with a beveled gear wheel 88 on the inner end of a shaft 89 journaled in the bearing 69. The bearing 69 extends into a slot or opening 90 in the plate 36, and the end of the shaft 89 has a small gear wheel 91 within the top section of the machine.

Slidably keyed upon the shaft 84 for rotative continuity therewith is a clutch member 92 and said member is adapted to be shifted into interlocking engagement with either of the beveled gear wheels 86 or 87. Engaging the clutch member 92 is a fork 93 on the inner end of a rock shaft 94 journaled in the sleeve portion 53 of the housing 47, said rock shaft having the outer end thereof provided with a crank 95 that may be set to hold the clutch member 92 in engagement with either of the beveled gear wheels 86 and 87. The clutch member and its adjusting mechanism constitutes means for controlling the direction of reciprocation of the vertical spindle 56 by power supplied to the gear wheel 91.

Figure 10:
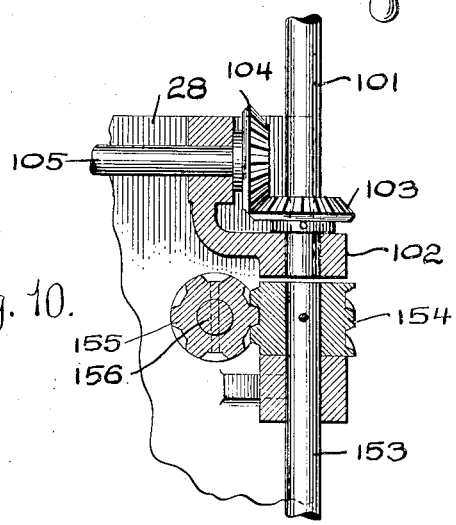
Fig. 10 is a vertical cross sectional view taken on the line X—X of Fig. 8.
Figure 11:
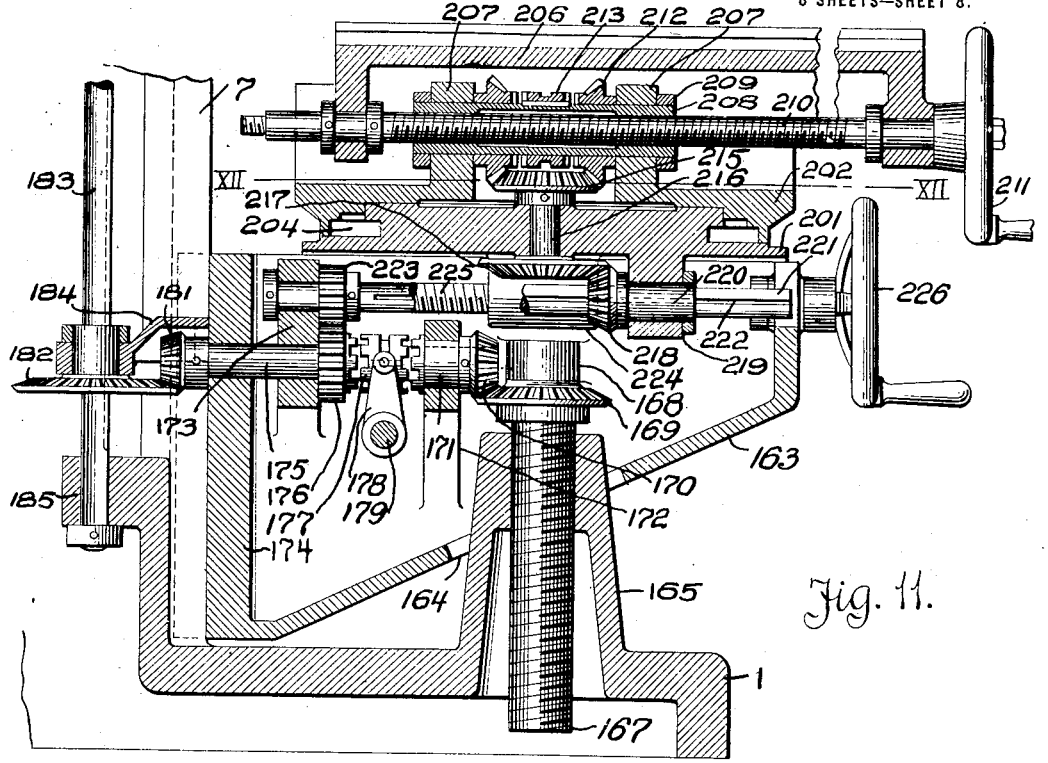
Fig. 11 is a vertical longitudinal sectional view of the universal table.
Figure 12:
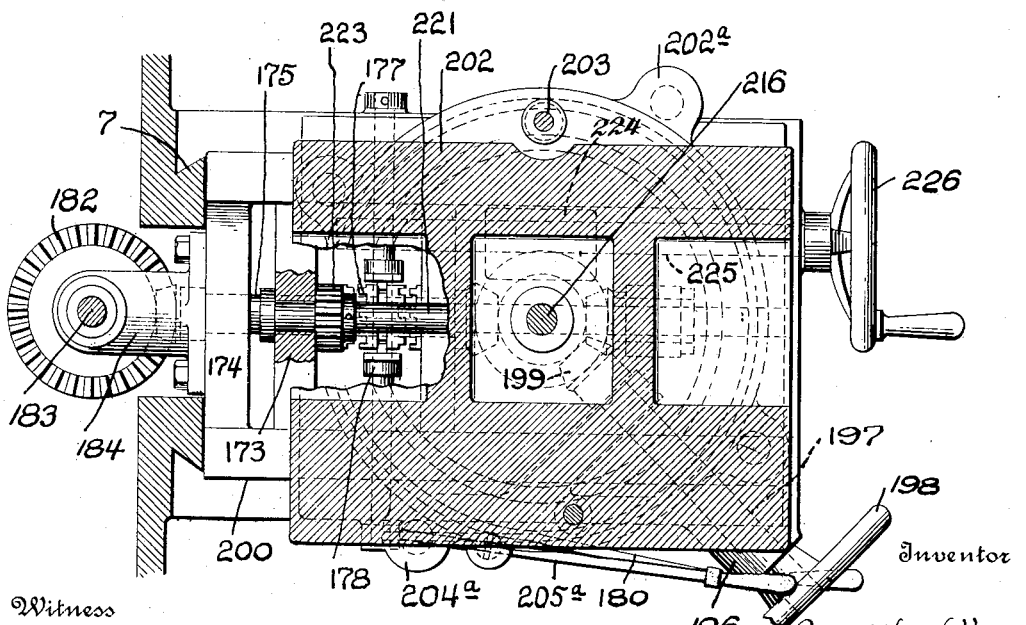
Fig. 12 is a horizontal sectional view taken on the line XII—XII of Fig. 11, and partly broken away.

The plate 36 has the inner side thereof provided with a sleeve 96 loosely surrounding the shaft 65 and rotatable on the sleeve 96 is the hub portion 97 of a large gear wheel 98 and a worm gear 99, the former meshing with the gear wheel 91. The worm gear 99 meshes with a worm portion 100 of a vertical shaft 101 having the upper end thereof journaled in the top wall 12 of the machine and the lower end thereof journaled in an angle bearing 102 carried by the frame 28. This is best shown in Fig. 10 where it will be noted that the lower end of the shaft 101 has a beveled gear wheel 103 meshing with a similar wheel 104 on a longitudinal shaft 105 journaled in the angle bearing 102 and a similar angle bearing 106 carried by the frame 28. Now, by reference to Fig. 8, it will be observed that the longitudinal shaft 105 has a large beveled gear wheel 107, adjacent the bearing 106, and said beveled gear wheel meshes with a small beveled gear wheel 108 on a transverse variable speed shaft 109, journaled in the side of the frame 28 and the bearing 110$^a$ carried by said frame. The variable speed shaft 109 is provided with a plurality of speed gears 110 and adapted to mesh with either of these gears is a gear 111 carried by a gear shift member 112 having a sleeve portion 113 slidably keyed upon a shaft 114, journaled in a portion of the angle bearing 106. This is best shown in Fig. 8 where it will be observed that the sleeve portion 113 of the gear shift member 112 extends through the wall 9 of the top section and into a casing 115, carried by said wall. The casing 115 has an angularly disposed slot 116 with one of the walls thereof provided with spaced and stepped sockets 117 adapted to receive a crank 118 on the end of the sleeve portion 113. By shifting the crank 118, the sleeve portion 113 may be rocked or shifted longitudinally of the shaft 114 and in this manner the gear 111 may be placed in mesh with either of the speed gears 110. The crank 118 has a device 119 so that it may be locked relative to the casing 115 to prevent accidental shifting of the gear shift member 112. In the gear shift member 112 is a gear 120 slidably keyed upon the shaft 114 and meshing with the gear 111 so that movement may be imparted to one of the speed gears 110 from the shaft 114.

On the shaft 114, is a worm gear 121 constantly in mesh with the worm 29 on the auxiliary vertical shaft 26. It is now apparent that power is transmitted from the auxiliary vertical shaft 26 to the shaft 114, shaft 109, shaft 105, shaft 101, through the worm gear 99 and a train of gears to the shaft 89, by shaft 84 and shaft 80 to the pinion 76 and then by virtue of the rack sleeve 73, the vertical spindle 56 may be raised and lowered by power; the direction of movement may be controlled by the clutch member 92 and the speed of such movement controlled by the variable speed mechanism including the gear shift member 112.

*Horizontal spindle and its operating mechanism*, (Figs. 1 and 2, 7, 8 and 9.)

The principal parts of the horizontal spindle are similar to the parts of the vertical spindle 56, said horizontal spindle being capable of a reciprocable and rotary movement and either movement reversed. The horizontal spindle is designated 122 and is disposed longitudinally of the machine in a bearing 123 carried by the bottom of the frame 28. The inner end of the spindle 122 has a gear wheel 124 for imparting a rotary movement to said spindle but not interfering with a reciprocable movement of the spindle through the gear wheel. Meshing with the gear wheel 124 is a gear wheel 125 mounted on a shaft 126 journaled in suitable bearings provided therefor on the frame 28. The shaft 126 has a beveled gear wheel 127 constantly in mesh with the beveled gear wheels 30 and 31 of the auxiliary vertical shaft 26. It is from this shaft that a rotary movement is imparted to the spindle 122 and the direction of rotation of said spindle is controlled by the clutch member 32.

The end of the spindle 122 extends through the wall 5 of the machine and a bearing 128 carried by said wall. On the end of the spindle is a rack sleeve 129, similar to the rack sleeve 73 of the vertical spindle 56, and the rack sleeve 129 is adapted to be shifted through the medium of a pinion actuated from a shaft 130 extending longitudinally of the machine. The shaft 130 extends into a bearing 131 depending from the bearing 123 or the frame 28 and said shaft has a beveled gear wheel 132 meshing with a similar wheel 133 on a transverse shaft 134 journaled in the bearing 131, the wall 2 of the pedestal section, and a bearing 135 of the frame 28. The outer end of the shaft 134 has a hand wheel 136 and through the medium of the mechanism just described, the horizontal spindle 122 may be manually reciprocated. On the shaft 134 are loose beveled gear wheels 137 and 138 adapted to be fixed relatively to the shaft 134 for rotation therewith, by a clutch member 139 slidably keyed on the shaft 134 between the gear wheels 137 and 138. Engaging the clutch member 139 is a crank or fork 140 carried by a vertically disposed rock shaft 141 supported from the bottom of the bearing 123. The rock shaft 141 has a crank 142 and pivotally connected to said crank is a lever 143 extending through an opening 144 in the wall 2 of the machine. The lever 143 is adapted to engage in a notched plate 145 carried by the wall 2, and said lever is pivoted to the crank 142 so that it may be raised out of a notch of the plate 145 and shifted to another notch of said plate, said lever and its associated parts constituting means for determining the direction of rotation of the shaft 134 by power, also means for locking the clutch member 139 against accidental shifting.

Meshing with the beveled gear wheels 137 and 138 is a horizontally disposed beveled gear wheel 146 on the upper end of a vertical shaft 147 journaled in the depending bearing 135, said bearing being somewhat U-shaped or in the form of a stirrup as shown by dotted lines in Fig. 2. On the lower end of the vertical shaft 147 is a beveled gear wheel 148 meshing with a beveled gear wheel 149 on a transverse shaft 150 journaled in the bearing 135. On one end of the shaft 150 is a worm gear 151 meshing with a worm 152 on the lower end of a vertical shaft 153 that vertically alines with the shaft 101, as shown in Fig. 10. The shaft 153 is journaled in suitable bearings carried by the bearing 135 and the upper end of said shaft has a worm gear 154 meshing with a worm 155 on a transverse variable speed shaft 156 journaled in bearings of the frame 128. The variable speed shaft 156 is provided with speed gears 157 similar to the gears 110 and adapted to engage either of the speed gears 157 is a shiftable gear 158 forming a part of the gear shifting mechanism which has been generally designated 159, said mechanism being identical in constructon with the mechanism previously described as including the elements 111 to 120 inclusive. The gear wheel 158 is adapted to be driven by a worm gear 160 forming part of the mechanism 159 and meshing with the worm 29 on the auxiliary vertical shaft 26.

From the foregoing, it will be observed that the power of the vertical shaft 26 can be transmitted to the rack sleeve 129 for reciprocating said sleeve and the horizontal spindle 122 by power, in any direction as controlled by the clutch member 130, and at any desired speed in either direction as controlled by the variable speed mechanism 159.

Associated with the horizontal spindle is an arbor support, best shown in Figs. 1 and 2, comprising an arm 161 projecting from the front wall 11 of the machine. Adjustable on the arm 161 is an arbor support 162 and this support may coöperate with the spindle 122 in supporting a cutter or other tool so as to be driven by the horizontal spindle.

*Universal table*, (Figs. 1, 2, 7, 9, 11 and 12.)

The shears 7 on the front wall 4 of the pedestal section of the machine are dovetailed, similar to the shears 14, and slidable on the shears 7 and adapted to be raised and lowered is a hollow table body or knee 163 having the bottom thereof provided with an opening 164 to receive a post 165, carried by the base 1 of the machine. Adjustable in the post 165 is a screw 167 having the upper end thereof engaging a bracket 168 in the hollow table body or knee 163. On the upper end of the screw 167 is a beveled gear wheel 169 meshing with a similar wheel 170 fixed on a clutch sleeve 171 journaled in a bracket 172 within the table body or knee 163. Another bracket 173, within the table body 163 coöperates with the rear wall 174 of the table body in supporting a shaft 175 that extends into the clutch sleeve 171. The shaft 175 has a loose gear wheel 176 provided with a clutch portion and slidably keyed on the shaft 175 and adapted for rotation therewith is a clutch member 177 adapted for interlocking engagement either with a clutch sleeve 171 or clutch portion of the gear wheel 176. The clutch member 177 is employed for establishing rotative continuity between the shaft 175 and the gear wheel 176 or between said shaft and the clutch sleeve 171 carrying the beveled gear wheel 170. A fork or crank 178 engages the clutch member 177 for shifting said clutch member, said crank or fork being carried by a transverse rock shaft 179 that extends out of the side wall of the table body or knee 163. A lever 180 on the outer end of the rock shaft 179 permits of the clutch member 177 being shifted, and said lever may be set in a desired position to hold the clutch member against accidental movement.

The shaft 175 has a beveled gear wheel 181 on the rear end thereof, said beveled gear wheel meshing with the horizontal beveled gear wheel 182 adapted to rotate with a vertically disposed shaft 183 and also adapted for longitudinal movement on said shaft when the table or knee is raised or lowered. The horizontal beveled gear wheel 182 is supported relatively to the beveled gear wheel 181 by a bracket 184 projecting into the pedestal section of the machine and carried by the rear wall 174 of the table or knee.

The shaft 183 has the lower end thereof journaled in a bracket 185 forming part of the base 1 of the machine, and the upper end of said shaft extends into a bearing 186 protruding forwardly in the bearing 135. On the upper end of the shaft 183 is a horizontally disposed gear wheel 187 adapted to be engaged by one or the other of meshing gear wheels 188 in a gear casing 189, which is suitably supported from the bearing 135 and has a crank portion 190 that permits of the gear casing being laterally shifted so that one of the gears 188 may mesh with the gear 187. The crank 190 is connected by a link 191 to a crank 192 on a transverse rock shaft 193, said rock shaft having one end thereof extending through the walls of the machine and provided with a crank 194 that may be set, relatively to the wall 2, to hold the gear casing 189 in a shifted position.

The gear casing 189 has for its pivot the vertical shaft 153 and mounted on said shaft within the gear casing and meshing with the large gear 158 is another large gear wheel 195.

In consequence of this arrangement, the vertical shaft 153, which may be operated at various speeds, is adapted for imparting movement to the vertical shaft 183 and by interposing the gear casing 189 between the shafts 153 and 183, it is possible to reverse the direction of rotation of the shaft 183 at any time relative to the direction of rotation of the shaft 153. Since power is transmitted to the vertical shaft 183 the clutch member 177 may establish a driving relation between the shaft 175 and the beveled gear wheel 170, so that the hollow table body or knee 163 may be raised or lowered, such direction of travel being controlled by the crank 194 while the speed at which the table or knee is raised or lowered is controlled by the variable speed mechanism 159.

In order that the table or knee 163 may be manually raised and lowered, the side of the table or knee is provided with a bearing 196 for an angularly disposed shaft 197, said shaft having the outer end thereof provided with a hand wheel 198, and the inner end thereof with a beveled gear wheel 199 meshing with the beveled gear wheel 169 of the screw 167. Since the shaft 197 is carried by the table or knee, said shaft may be rotated to impart a similar movement to the screw 167 and thus permit of the table or knee being manually raised or lowered.

The top of the table or knee 163 is provided with a longitudinal tongue 200 and slidable on said table or knee is a table top 201 having a groove to receive the tongue 200 of said table. On the table top 201 is a rotatable support 202 adapted to be manually adjusted relative to the table top 201 and fixed in an adjusted position by suitable hold fast devices 203. These devices may be in the form of bolts and nuts with the heads of the bolts so disposed in an annular space 204 between the table top and the rotatable support, so that when the bolts are tightened, the heads thereof will clamp the rotatable support relative to the table top.

The rotatable support 202 has the top thereof formed with a dove-tailed groove to receive a similarly formed tongue 205 of a reciprocable work holder 206, said work holder having the usual longitudinal or transverse ways so that a piece of work may be clamped thereon. The work holder 206 may be reciprocated by power or hand and for this purpose, the support 202 has bearings 207 extending upwardly into the work holder. Journaled in the bearings 207 of the rotatable support 202 is a longitudinal rotatable nut 208 held against longitudinal movement by heads or washers 209 on the ends of the nut. Extending through the nut 208 is a longitudinal screw 210 held for rotation in the ends of the work holder and against longitudinal movement relatively thereto. Each end of the screw 210 is shaped and adapted to accommodate a hand wheel 211 by which the work holder may be manually reciprocated.

Loose on the nut 208, between the bearings 207, are beveled gear wheels 212 and either of these beveled gear wheels may be engaged by a clutch member 213 slidably keyed on the nut 208 and adapted for rotation therewith. The clutch member 213 may be shifted through the medium of a fork, rock shaft and crank, generally denoted 214 and operatable at the side of the rotatable support 202.

Meshing with the beveled gear wheels 212 is a horizontal beveled gear wheel 215 mounted on the upper end of a shaft 216 journaled in the table top 201. The lower end of the shaft 216 has a beveled gear wheel 217 meshing with a similar wheel 218 on a sleeve 220, journaled in a depending bearing 219 of the table top 201. The sleeve 220 is held against longitudinal movement, and extending through said sleeve is a longitudinal shaft 221 that has the inner end thereof journaled in the bracket 173 of the table or knee 163. The shaft 221 has a longitudinal key way 222 for a key or spline carried by the beveled gear wheel 218 of the sleeve 220, so that when movement is imparted to the shaft 221, the beveled gear wheels 218 and 217 may, through the medium of the shaft 216, and the beveled gear wheel 215, impart movement to one of the beveled gear wheels 212.

The shaft 221 has a gear wheel 223 meshing with the gear wheel 176 and when the clutch member 177 establishes a driving relation between the gear wheel 176 and the shaft 175, power may be employed for reciprocating the work holder 206.

As the shaft 221 does not interfere with the longitudinal movement of the table top 201, said table top may be manually shifted on the table or knee 163 and this is accomplished in the following manner. The table top 201 has a depending nut 224 in screw-threaded engagement with a longitudinal screw 225 carried by the table or knee 163, said screw having the outer end thereof provided with a hand wheel 226. By rotating this hand wheel the table top may be moved back and forth on the table or knee.

Again considering the rotatable support 202, said support has a plurality of apertured lugs 202$^a$ adapted to receive a pin 203$^a$ in a guide 204$^a$ on the table top 201. The pin 203$^a$ may be raised and lowered by a suitable pivoted lever 205$^a$ at the side of the table and in this manner the support 202 held against rotation.

From the foregoing, it will be observed that the universal table with its numerous adjustments permits of a piece of work being correctly positioned, relative to either of the spindles of the machine, so that various operations can be performed on a piece of work by the spindles individually or collectively. It is possible while performing operations with either spindle to regulate the speed of either spindle at a desired location and feed the work holder in either a vertical or lateral plane. Futhermore, with a piece of work correctly positioned by the universal table, it is possible to regulate the speed of the spindles relatively to the piece of work and reverse the direction of travel of the spindle at any time. By virtue of the main change speed gear mechanism, the operation of the entire machine may be set for a predetermined speed and the two variable speed mechanisms contribute to a perfect control of the machine. As the transmission of power has been considered in detail in connection with the principal operatable elements of the machine, it is thought unnecessary to consider a general operation or further point out how pieces of work may be operated upon.

What I claim is:—

1. In a boring machine, the combination of a main frame, a universal table capable of vertical, rotary and lateral adjustment, power means for vertically and laterally adjusting said table, a universal head carried by said frame and capable of vertical and angular adjustment, means including a screw shaft and unit in said main frame adapted for vertically adjusting said head, and a reciprocable and rotary sipndle, carried by said head and adapted to be operated by said power means.

2. In a boring machine, the combination of a main frame, a table, a head carried by said main frame, power means adapted for adjusting said table and said head, a horizontal spindle carried by said main frame, a vertical spindle carried by said head, both of said spindles being capable of reciprocatory and rotary movement, and means utilizing said power means adapted for operating either of said spindles.

3. In a boring machine, the combination of a main frame, a table, a head, power means for adjusting said table and said head relatively to said main frame, a spindle carried by said head, a spindle carried by said frame, both of said spindles being capable of reciprocatory and rotary movement, means adapted for utilizing said power means so that either spindle may be operated, and means adapted for reversing the reciprocatory or rotary movement of either spindle.

4. In a boring machine, the combination of a main frame, a universal table at the base thereof capable of vertical, rotary and lateral adjustment, a driven main shaft in said frame, a change speed gear mechanism adapted for regulating the speed of said driven shaft, means for transmitting power from said shaft to said table so that said table may be vertically and laterally adjusted by power, a universal head carried by said frame and capable of vertical and angular adjustment, means adapted for vertically adjusting said head, a spindle carried by said head having a reciprocable and rotary movement and adapted to be operated from said shaft, and means adapted for reversing either movement of said spindle.

5. In a boring machine, a base, a main frame carried thereby and provided with operatable spindles, a driven shaft in said main frame, means in said main frame for controlling the direction of rotation of said shaft, a knee adjustable relative to said main frame, a shaft in said knee driven from the shaft in said main frame irrespective of the position of said knee, means operated by the shaft within said knee adapted for raising and lowering said knee relative to said base, and a work holder on said knee.

6. In a boring machine, the combination with a main frame having operatable spindles, and means in said main frame adapted for operating said spindles, of a knee adjustable relative to said main frame, a shaft in said knee movable therewith and adapted to have movement imparted thereto irrespective of the position of said knee from the spindle operating means within said main frame, a screw supported by said main frame and operated by said shaft adapted for raising and lowering said knee, a reciprocable table top on said knee, a rotatable support on said table top, and a reciprocable work holder carried by said support.

7. In a boring machine, the combination with a main frame having operatable spindles and means in said frame adapted for operating said spindles, of a knee adjustable relative to said main frame, a shaft in said knee movable therewith and adapted to be operated irrespective of the position of said knee by the spindle operating means in said main frame, a screw supported by said main frame and adapted to be operated by said shaft to raise and lower said knee, means adapted for operating said screw independent of said shaft operating means, a reciprocable table top on said knee, manual means adapted for adjusting said table top, a rotatable support on said table top and adapted to be manually adjusted, and a reciprocal work holder on said support adapted to be operated by said shaft and by hand.

8. In a boring machine, the combination with a main frame having a universal table, a horizontal spindle, and operating means for said spindle, of a universal head carried by said main frame and comprising a plate in the upper end of said main frame, manual means within said main frame adapted for raising and lowering said plate, a housing having a face plate rotatable on the first mentioned plate and adapted to be fixed relative thereto, a rotary and reciprocable spindle supported by said housing, and means extending within said main frame into said housing adapted for imparting either a reciprocable or rotary movement to said spindle.

9. In a boring machine, the combination with a main frame having a universal table, a horizontal spindle, and operating means in said main frame for said horizontal spindle, of a universal head at the upper end of said main frame, comprising a housing having vertical and angular adjustment relative to said main frame, a rotary and reciprocable spindle carried by said housing, means in said housing extending into said main frame to be operated by operating means therein for imparting a rotary movement to said spindle, means in said housing operated by the same means within said main frame adapted for reciprocating said spindle and means in said housing controlling the direction of rotation and reciprocation of said spindle.

10. In a boring machine, the combination with a main frame, an auxiliary driven shaft therein, and a screw shaft operated indirectly from said auxiliary shaft, of a universal head carried by said main frame capable of vertical and angular adjustment, a rotary and reciprocable spindle carried by said head, means in said head extending into said main frame and actuated by said auxiliary shaft adapted for imparting a rotary movement to said spindle, means in said housing adapted for controlling the direction of rotation of said spindle, means in said housing extending into said main frame and operated by said screw shaft and adapted for reciprocating said spindle, and means in said housing adapted for controlling the direction of reciprocation of said spindle.

In testimony whereof I affix my signature in the presence of two witnesses.

RAYMOND H. HILL.

Witnesses:
 KARL H. BUTLER,
 ANNA M. DORR.